United States Patent [19]
Thurow et al.

[11] Patent Number: 5,975,506
[45] Date of Patent: Nov. 2, 1999

[54] AIR SPRING HAVING A NON-CONSTANT CORD ANGLE AND METHOD FOR MAKING SAID AIR SPRING

[75] Inventors: Gerhard Thurow, Garbsen; Paul Cerny, Ronnenberg, both of Germany

[73] Assignee: Continental Aktiengesellschaft, Hanover, Germany

[21] Appl. No.: 08/835,964

[22] Filed: Apr. 11, 1997

[30] Foreign Application Priority Data

Apr. 12, 1996 [DE] Germany .......................... 196 14 476

[51] Int. Cl.$^6$ .................................................. F16F 9/04
[52] U.S. Cl. .................................. 267/64.23; 267/64.21; 267/64.27
[58] Field of Search ........................... 267/64.21, 64.23, 267/64.27, 64.19; 188/298

[56] References Cited

U.S. PATENT DOCUMENTS

| | | |
|---|---|---|
| 3,391,922 | 7/1968 | Axthammer ........................ 267/64.23 X |
| 4,325,541 | 4/1982 | Korosladanyi et al. ......... 267/64.21 X |
| 4,741,517 | 5/1988 | Warmuth, II et al. . |
| 4,807,858 | 2/1989 | Watanabe et al. . |
| 5,080,328 | 1/1992 | Pees . |
| 5,566,929 | 10/1996 | Thurow ............................. 267/64.27 X |

FOREIGN PATENT DOCUMENTS

| | | |
|---|---|---|
| 357881 | 8/1980 | Austria . |
| 0285726 | 10/1988 | European Pat. Off. . |
| 2836662 | 10/1979 | Germany . |
| 4136460 | 5/1993 | Germany . |

*Primary Examiner*—Matthew C. Graham
*Attorney, Agent, or Firm*—Walter Ottesen

[57] ABSTRACT

The invention relates to an air spring having a composite flexible member 4 in which cords 22 are embedded as a reinforcement. The cords 22 have cord angles to the peripheral direction of the flexible member 4 over the longitudinal length of the flexible member. The flexible member 4 comprises two flexible-member components (12a, 12b). The cord angle a in the first flexible-member component 12a is different from the cord angle β in the second flexible-member component 12b. A method for making such an air spring is also disclosed.

7 Claims, 4 Drawing Sheets

AIR SPRING HAVING A NON-CONSTANT CORD ANGLE AND METHOD FOR MAKING SAID AIR SPRING

FIELD OF THE INVENTION

The invention relates to an air spring comprising a flexible member which is arranged between two end parts and is attached to these end parts with attachment elements. The air spring includes a roll-off piston over which the flexible member can roll. Cords are embedded in the flexible member and these cords are at a specific cord angle to the peripheral direction of the air spring and the cord angle varies over the length of the flexible member. The invention also relates to a method of making such an air spring.

BACKGROUND OF THE INVENTION

Air springs are increasingly utilized for suspension in passenger motor vehicles to increase the comfort of the suspension. An especially high level of suspension comfort is ensured when the air springs exhibit an excellent vibration characteristic over the entire vibration range. However, it has been shown that in air springs, which have a cylindrical flexible member, the suspension comfort is limited for small vibration amplitudes. The negative vibration characteristic is produced in that a hardening of the air spring occurs for small vibration amplitudes which limits the suspension comfort for these amplitudes.

Air springs have been developed which exhibit no spring hardening for small vibration amplitudes and therefore have an excellent vibration characteristic over the entire vibration range. The flexible member of such an air spring has, for example, a cylindrical form in the roll-off region thereof in order to facilitate an excellent roll off at large amplitudes of vibration. In contrast, the flexible member has in its chamber region, for example, the form of a barrel having a bulging mid portion. This barrel can then be slightly shortened under the action of a small force so that the air spring provides excellent suspension comfort even for small amplitudes of vibration. The cords are worked into the flexible member as a reinforcement. In the regions of different diameter, the cords assume different cord angles to the peripheral direction of the flexible member in order to make possible the above-described configuration of the air spring having different diameters in the longitudinal direction of the flexible member. The diameter of the flexible member, which is built into the air spring, is dependent upon the magnitude of the cord angle.

Published European patent application 0,285,726 (corresponds to U.S. patent application Ser. No. 032,212, filed Mar. 30, 1987) discloses air springs having a cord angle to the peripheral direction of the flexible member which is varied over the length thereof. The shape of the flexible member is influenced by the variation of the cord angle over the length of the flexible member. Especially air springs can be configured in the manner explained above.

The air springs disclosed in European patent publication 0,285,726 were produced in that the cords are wound individually into a flexible member disposed on a mandrel. For this purpose, the individual cords assume a specific angle to the mandrel and the mandrel is rotated about its longitudinal axis and is moved in longitudinal direction so that the individual cords are pulled into the flexible member at the specific angle. The desired variation of the angle of the cords takes place because of a variation of the speed of the mandrel in the longitudinal direction. Here, the angle of the embedded cords to the peripheral direction of the flexible member is that much greater the faster the mandrel moves in the longitudinal direction.

With the method disclosed in European patent publication 0,285,726, air springs can be made having flexible members wherein the cord angle varies in the longitudinal direction of the flexible member. However, it is necessary to wind several hundred cords into the flexible member of the air spring in order to impart a long service life and a high burst pressure thereto. However, this is only possible with great difficulty with the method known from the above-mentioned European patent publication because the cords must all be guided individually and this leads to problems when there is a high number of cords. Finally, processing errors can occur when the number of wound cords is too high and this can affect the quality of the finished air spring. In the known method, the number of wound-in cords is limited to a quantity which leads neither to a satisfactory service life nor to a satisfactory burst pressure.

SUMMARY OF THE INVENTION

It is an object of the invention to provide an air spring of the kind referred to above which includes a high number of cords and wherein the cord angle varies in the peripheral direction of the flexible member over the longitudinal length thereof. It is also an object of the invention to provide a method for making such an air spring.

The invention is directed to a rolling-lobe air spring for attachment to first and second holding parts and the second holding part includes a roll-off piston. The rolling-lobe air spring includes: an annular wall defining a longitudinal axis and being a flexible member; the flexible member having first and second end portions for attachment to the first and second holding parts, respectively; the flexible member being defined by a first flexible-member component having the first end portion and a second flexible-member component connected to the first flexible-member component and having the second end portion; a first attachment element for securing the first end portion to the first holding part and a second attachment element for securing the second end portion to the second holding part to permit the flexible member to roll back and forth over the roll-off piston during the operation of the air spring; the first flexible-member component including a first fabric layer having a plurality of mutually adjacent cords defining a first cord angle; and, the second flexible-member component including a second fabric layer having a plurality of mutually adjacent cords defining a second cord angle different from the first cord angle.

The method according to the invention includes the steps of: winding the first fabric layer onto a mandrel defining a peripheral direction so that the cords of the first fabric layer assume the first cord angle with respect to the peripheral direction; winding the second fabric layer onto the mandrel so that the cords of the second fabric layer assume a second cord angle with respect to the peripheral direction and so as to cause first and second fabric layers to partially overlap each other to define an overlap region whereby an unfinished composite flexible member is formed; placing the unfinished flexible member on a vulcanization mandrel and vulcanizing the unfinished composite flexible member; removing the vulcanization mandrel thereby leaving a finished composite flexible member including the first and second flexible-member components; mounting the finished composite flexible member between the first and second holding parts; and, attaching respective ends of the finished composite flexible member to corresponding ones of the holding parts utilizing the attachment elements.

With the above-mentioned method, either cylindrical or conical flexible members can be made. In the first case, a cylindrical mandrel is used as a vulcanization mandrel while, in the second case, the cylindrical mandrel is removed from the unfinished part and the unfinished part is pulled over onto a conical vulcanization mandrel.

The basic idea of the invention is that the flexible member of the air spring comprises two flexible-member components in which the cords assume a constant cord angle to the peripheral direction of the flexible member in each case.

The significant advantages of the invention are that the flexible-member components are wound from a fabric layer in which the individual cords have already been worked in. In this way, the processing of individual cords is unnecessary when making the air spring and this significantly simplifies manufacture. This notwithstanding, the cord angle varies over the length of the flexible member of the air spring. Furthermore, with the invention, the advantage is achieved that several hundred mutually adjacent cords can be worked into the layer without difficulty because the fabric layers can be produced in the conventional manner and a cord angle must not yet be considered. By utilizing cord layers having such a high number of cords, the service life of the air spring can be significantly lengthened and the burst pressure significantly increased. Finally, manufacturing errors which could diminish quality of the air spring are virtually excluded because of the simple method of manufacture.

A first flexible-member component is attached to the end part lying opposite the roll-off piston and the second flexible-member component is attached to the end part which includes the roll-off piston. According to a feature of the invention, the cord angle of the second flexible-member component is less than the cord angle of the first flexible-member component. In this way, the diameter of the composite flexible member in the roll-off region is less than the diameter in the chamber region of the composite flexible member and the composite flexible member thereby exhibits an excellent roll-off characteristic.

According to another feature of the invention, the cord angle of the second flexible-member component lies in an angular range of approximately 35° to 65°.

The cord angle should amount to at least 35° in this region so that the air spring has a sufficient supporting force. The supporting force of the air spring decreases sharply when this cord angle is below 35°.

According to another feature of the invention, the cord angle of the fabric layer of the first flexible-member component lies in an angular range of approximately 60° to 85°. An angle range of approximately 65° to 75° has been shown to be especially advantageous for this cord angle because, in this angular range, the flexible member of the air spring has, on the one hand, an especially high diameter in the chamber region while, on the other hand, the flexible member has a sufficiently high stability between the individual cords of the fabric layer which stability becomes lost with a further approximation of the angle to 90°.

According to another feature of the invention, the cords of the fabric layers are made of different materials in the flexible-member components. In this way, the advantage is obtained that the cords in the fabric layers can be adapted to the requirements which are imposed on the flexible-member components. In the second flexible-member component, a fabric layer as thin as possible is, for example, used so that an especially good roll-off characteristic of this flexible-member component is made possible. To achieve this, a thin cord is embedded in the flexible layer which withstands the mechanical loads in the roll-off region because of the characteristics of the material. A carbon fiber cord has, for example, been shown to be especially suitable. On the other hand, a cord with a high strength is selected for the fabric layer of the first flexible-member component which defines the chamber region of the air spring. This cord imparts the highest possible stability to this first flexible-member component because the loads are especially high in this region. For example, a cost-effective polyamide cord can be used to which the required strength is imparted via a large diameter. The first flexible-member component is rather thick because of the use of such a cord but this in no way constitutes a disadvantage because this first flexible-member component does not participate in the roll-off operation.

According to still another feature of the invention, the cords of the fabric layers in the flexible-member components are of different strength. In this way, the advantage is achieved that the individual flexible-member components are especially well adapted to the requirements which are imposed thereupon. Thus, in the second flexible-member component which rolls off over the roll-off piston, thin cords are used which provide an especially good roll-off performance of this flexible-member component. On the other hand, especially thick cords are used for reasons of stability in the first flexible-member component which defines the chamber region of the air spring so that this first flexible-member component can withstand high burst pressures.

According to another feature of the invention, the radial expansion of the second flexible-member component is delimited by a bell-shaped structure. In this way, the advantage is achieved that the radial expansion of the flexible-member component is not limited by a small cord angle but rather by the bell which takes up the forces acting in the radial direction. The cord angle of the component can therefore be increased which favorably influences the suspension characteristics of the air spring in this component.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
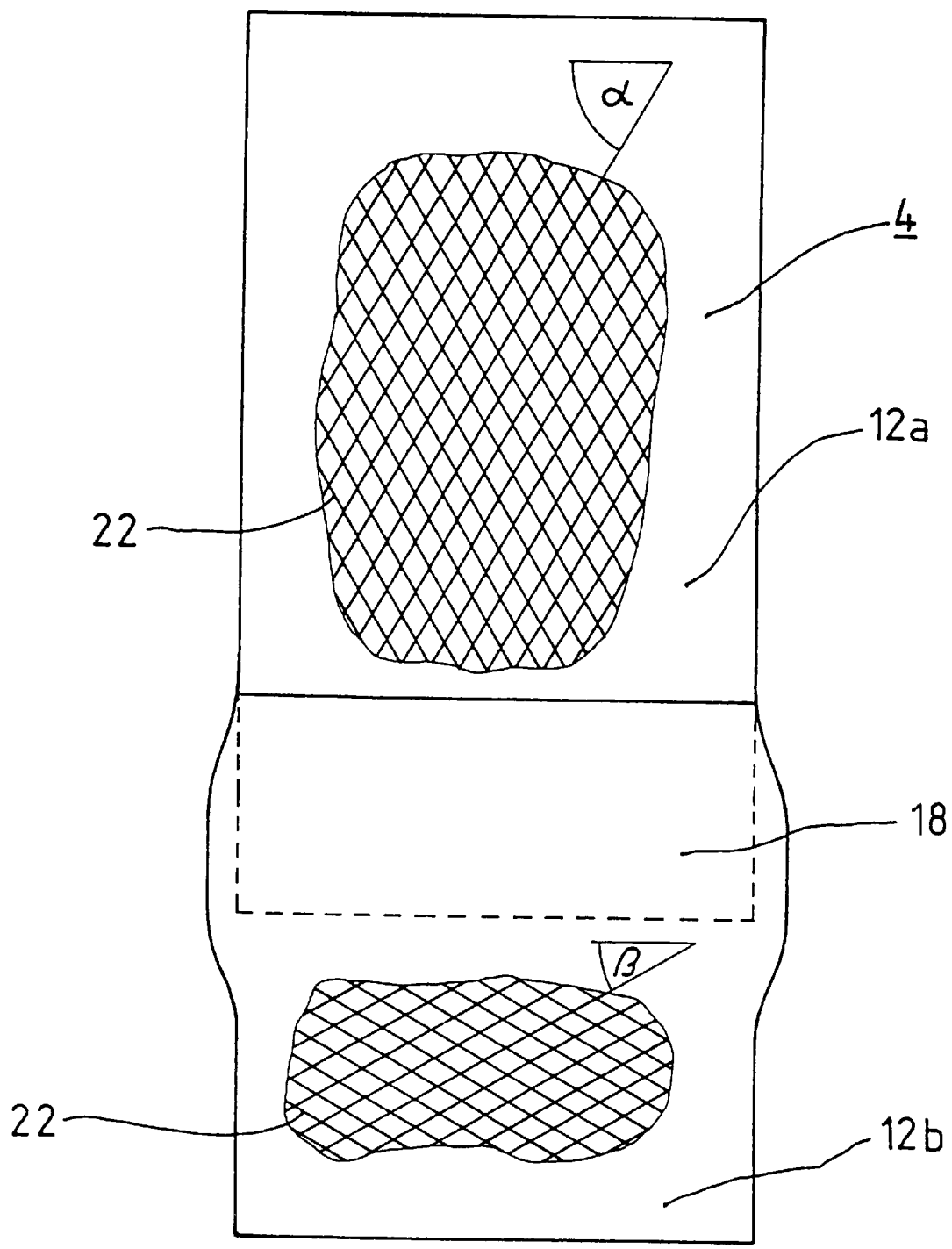
FIG. 1 is a schematic representation of the flexible member for an air spring according to an embodiment of the invention.

FIG. 1 shows a composite flexible member 4 which is comprised of first and second flexible-member components (12a, 12b) which conjointly define an overlap region 18. In this overlap region, the flexible-member components (12a, 12b) overlap or one of the flexible-member components 12b is spliced and the other flexible-member component 12a is inserted into the splice so that one of the flexible-member components 12b encloses the other flexible-member component 12a. Cords 22 are embedded in the fabric layers of each of the flexible-member components (12a, 12b). The cords 22 of flexible-member component 12a assume an angle α to the peripheral direction of the composite flexible member 4 and the cords 22 of flexible-member component 12b assume an angle β with respect to this peripheral direction. The angles α and β are different and, in the embodiment shown, the cord angle α in the first flexible-member component 12a is greater than the cord angle β in the second flexible-member component 12b. The first flexible-member component 12a can be expanded to a greater diameter under the action of a radial force than the second flexible-member component 12b.

Figure 2:
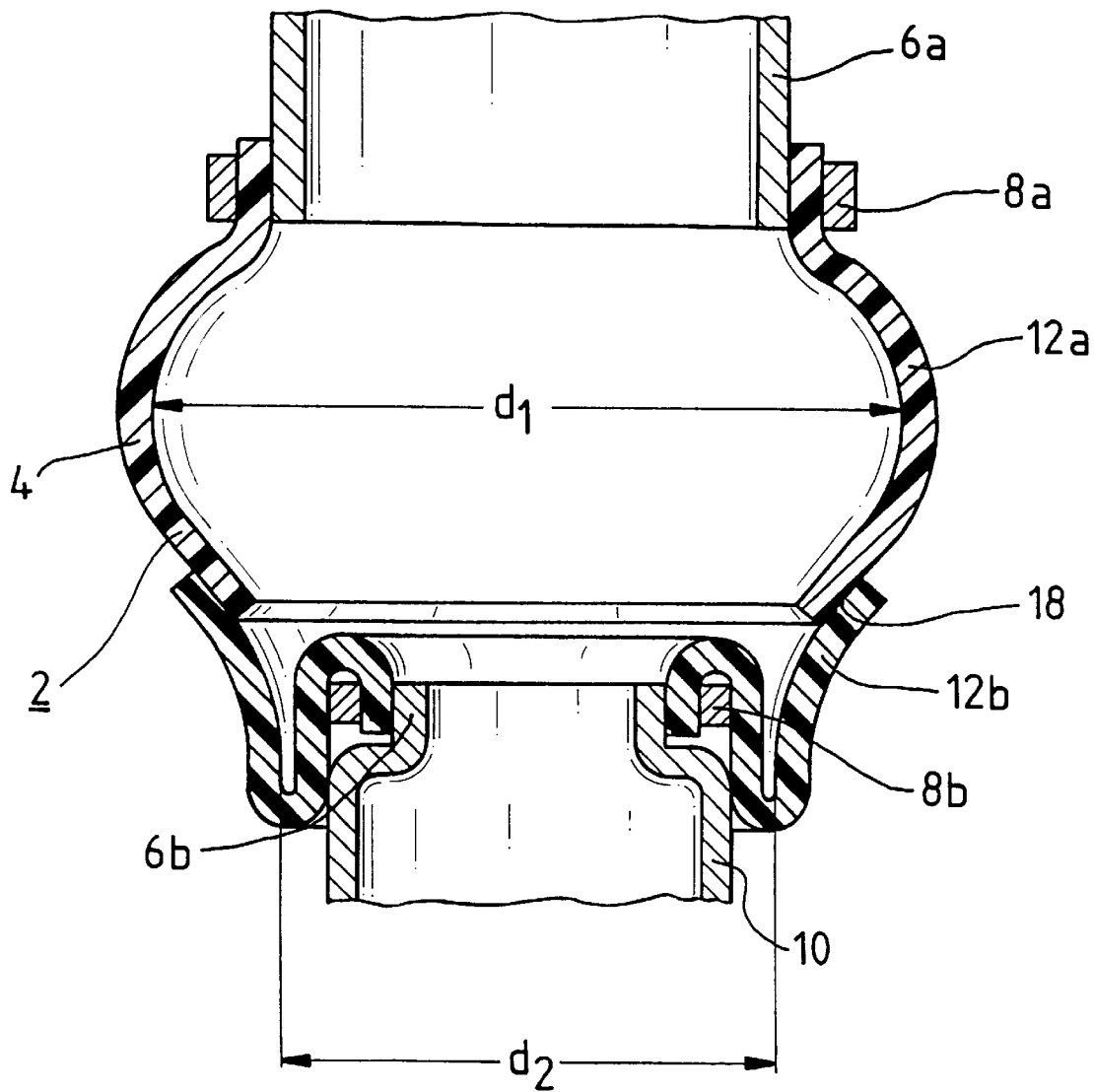
FIG. 2 is a section view of the air spring according to the first embodiment of the invention.

FIG. 2 is a schematic (not to scale) of an air spring 2 in cross section. The air spring 2 essentially comprises the two holding or end parts 6a and 6b to which the flexible member 4 shown in FIG. 1 is attached with the aid of attachment elements, such as radially-pressed clamping rings (8a, 8b). The flexible member 4 comprises first and second flexible-member components (12a, 12b) of which the first flexible-member component 12a encloses the chamber region of the air spring 2. On the other hand, the second flexible-member component 12b is attached to the end part 6b of the roll-off piston 10 and rolls off on this piston. Because of its larger cord angle α, the first flexible-member component 12a encloses a larger diameter $d_1$ than the second flexible-member component 12b, which, because of its smaller cord angle β, only encloses the diameter $d_2$. In this way, the chamber region of the air spring 2 has the annular bulge form shown in FIG. 2. With this kind of configuration of the composite flexible member 4, the condition is achieved that the air spring 2 exhibits an excellent vibration characteristic even under the action of smaller forces. More specifically, with the action of smaller forces in the longitudinal direction of the air spring 2, a shortening of the air spring 2 in the bulging chamber region is obtained because the air spring does not exhibit any hardening in this region.

Figure 3:
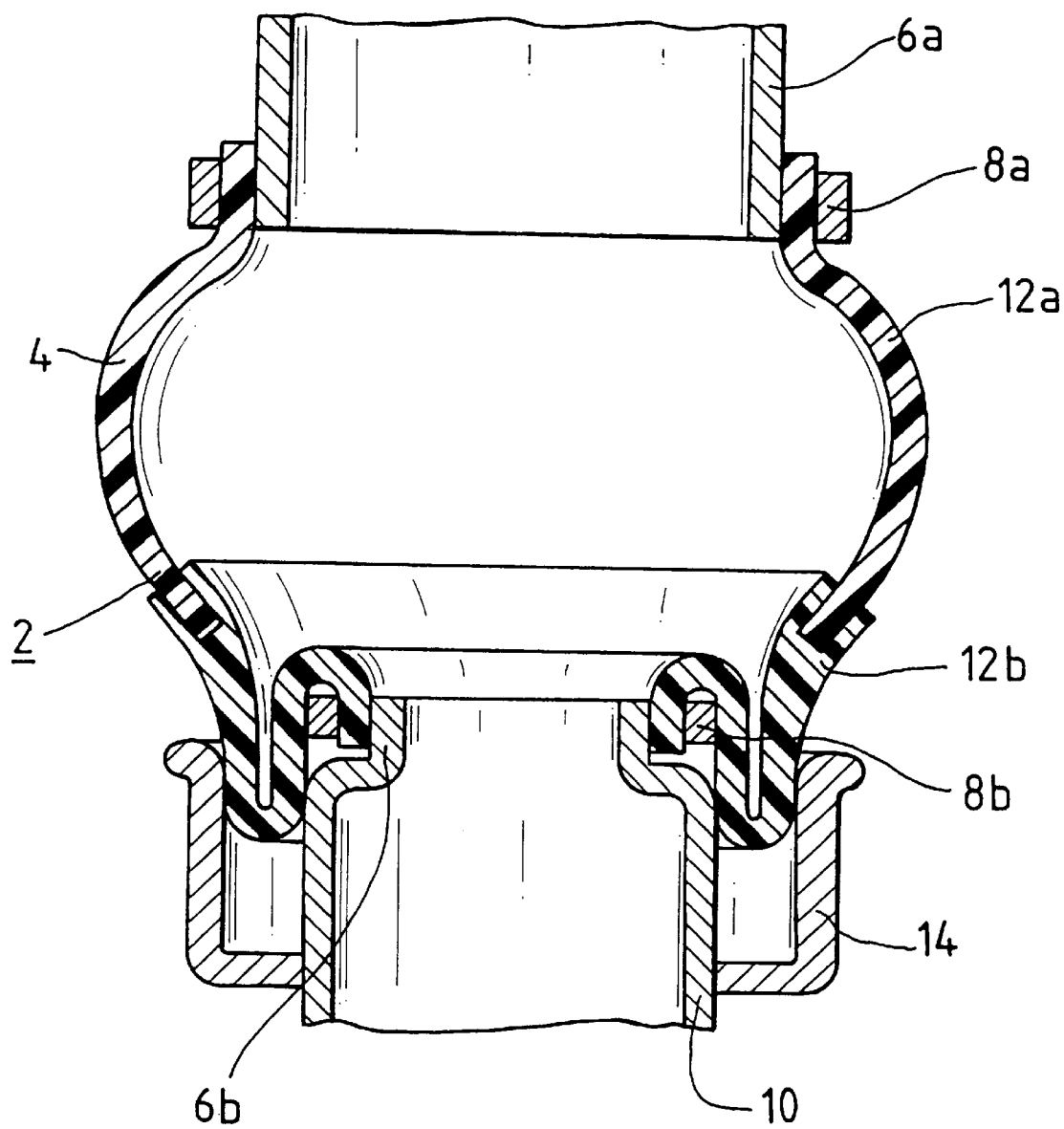
FIG. 3 is a section view of an air spring according to a second embodiment of the invention; and, FIG. 4 is a schematic showing a method for making an air spring according to the invention.

FIG. 3 shows schematically (not to scale) an air spring 2 according to another embodiment of the invention. This embodiment is configured in the same manner as the embodiment shown in FIG. 2. However, the second flexible-member component 12b is spliced and encloses a portion of the first flexible-member component 12a. Furthermore, in the air spring 2 shown in FIG. 3, the second flexible-member component 12b is surrounded by a bell-shaped member 14. The bell-shaped member 14 limits the diameter of the second flexible-member component 12b so that the limitation of the flexible-member component to a desired diameter $d_2$ must not be produced by a small cord angle in the second flexible-member component 12b. Accordingly, the cord angle β can be increased in the second flexible-member component 12b which, in total, improves the roll-off characteristics of the second flexible-member component 12b on the roll-off piston 10 and thereby the vibration characteristics of the air spring.

Figure 4:
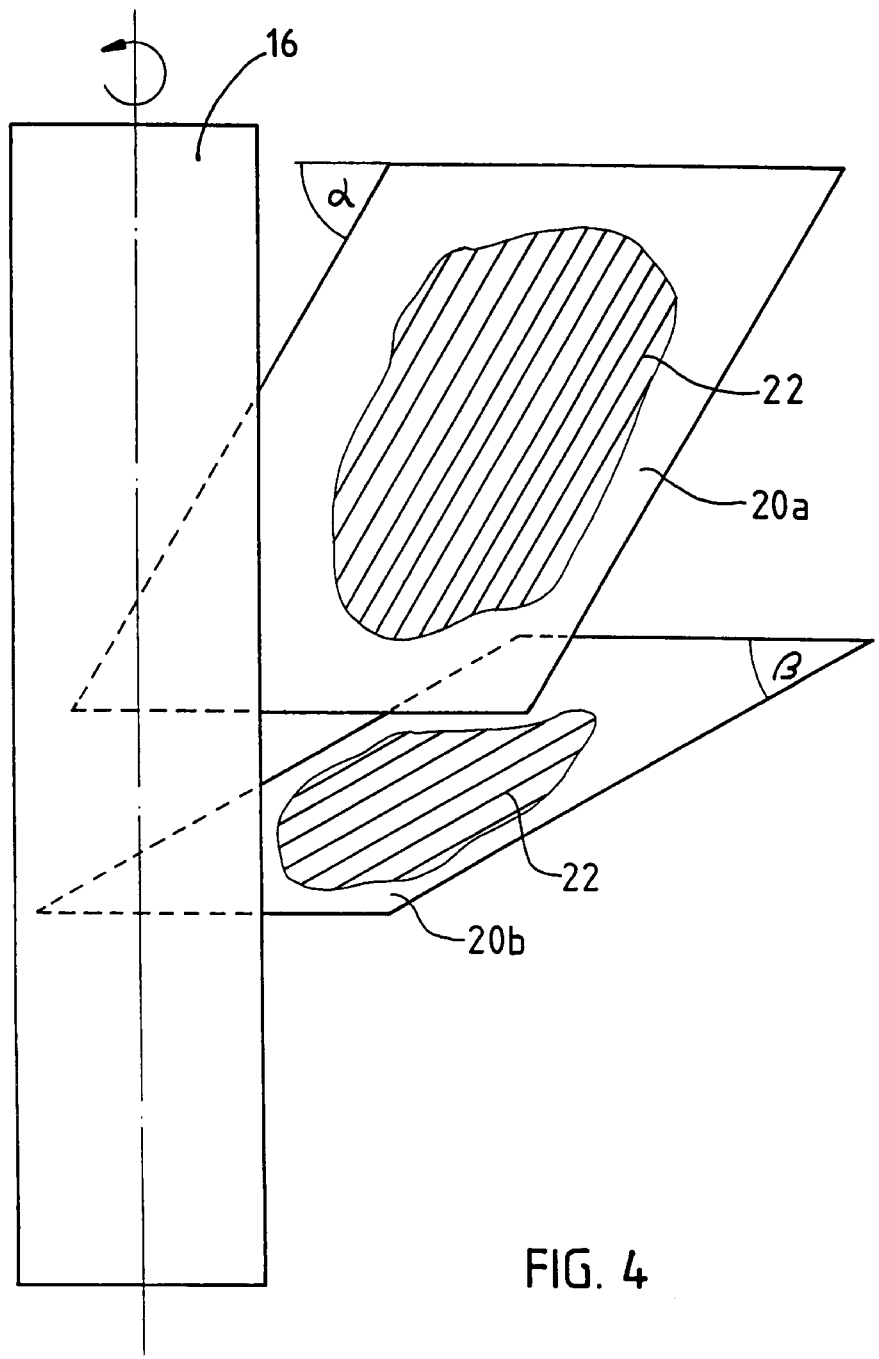

FIG. 4 shows a method for making an air spring 2 and especially a method for winding the composite flexible member 4. First, the two fabric layers (20a, 20b) are prepared in such a manner that the cords 22 in the fabric layer 20a are at an angle α to the peripheral direction of the winding mandrel 16 and the angle of the cords 22 embedded in the fabric layer 20b are at an angle β. Each of the fabric layers (20a, 20b) can include several hundred cords 22 lying closely one next to the other. The cords in each of the fabric layers can be made of different materials and can exhibit different strengths.

After the two fabric layers 20a and 20b have been placed, the mandrel 16 is rolled over the layers 20a and 20b in such a manner that the fabric layers 20a and 20b are rolled onto the mandrel 16. An overlapping of the fabric layers 20a and 20b is produced in a component region thereof. After the fabric layers 20a and 20b have been wound, the unfinished part comprising the two layers (20a, 20b) is vulcanized so that a composite flexible member 4 is produced as already explained in connection with FIG. 1. The mandrel 16 is used as a vulcanization mandrel to make a cylindrical composite flexible member 4 (see FIG. 1). Finally, the finished composite flexible member 4 is pulled off the mandrel 16 after vulcanization and is attached to the end parts (6a, 6b) of the air spring 2 (see, for example, FIG. 2).

The invention is not limited to a flexible member 4 made up of two flexible-member components (12a, 12b). Rather, the flexible member 4 can be assembled from several flexible-member components. The cords of at least two flexible-member components assume different cord angles to the peripheral direction of the composite flexible member.

It is understood that the foregoing description is that of the preferred embodiments of the invention and that various changes and modifications may be made thereto without departing from the spirit and scope of the invention as defined in the appended claims.

What is claimed is:

1. A rolling-lobe air spring for attachment to first and second holding parts, the second holding part including a roll-off piston, the rolling-lobe air spring comprising:

an annular wall defining a longitudinal axis and being a flexible member;

said flexible member having first and second end portions for attachment to said first and second holding parts, respectively;

a first flexible-member component having said first end portion and a second flexible-member component having said second end portion;

said first flexible-member component and said second flexible-member component being separate from each other and said flexible-member components having respective ends;

interface means for connecting said first flexible-member component to paid second flexible-member component at said ends whereby said connected flexible-member components conjointly define said flexible member;

a first attachment element for securing said first end portion to said first holding part and a second attachment element for securing said second end portion to said second holding part to permit said flexible member to roll back and forth over said roll-off piston during the operation of the air spring;

said first flexible-member component including a first fabric layer having a plurality of mutually adjacent cords defining a first cord angle;

said second flexible-member component including a second fabric layer having a plurality of mutually adjacent cords defining a second cord angle different from said first cord angle;

said flexible member having a first segment which includes and extends beyond said interface means and said flexible member further having a second segment which extends from below said interface means to said second end portion;

said first cord angle and said second cord angle being so selected that said upper segment defines a bellied configuration having a first diameter ($d_1$) and said second segment defines a cylindrical portion for rolling back and forth over said roll-off piston;

said cylindrical portion having a second diameter ($d_2$) lesser than said first diameter ($d_1$) and said interface means comprising a spline region when one of said ends has a spline formed therein and the other end is inserted into said spline so that said ends are splined together.

2. The rolling-lobe air spring of claim 1, wherein said second cord angle is less than said first cord angle.

3. The rolling-lobe air spring of claim 2, wherein said second cord angle lies in an angular range of approximately 30° to 65°.

4. The rolling-lobe air spring of claim 3, wherein said first cord angle lies in an angular range of approximately 60° to 85°.

5. The rolling-lobe air spring of claim 4, wherein the cords of said first fabric layer are made of a material different than the cords of said second fabric layer.

6. The rolling-lobe air spring of claim 5, wherein the cords of said first fabric layer having a strength different than the cords of said second fabric layer.

7. The rolling-lobe air spring of claim 6, wherein said second flexible-member component has a radial expansion; and, said rolling-lobe air spring further comprising a bell-shaped structure mounted on said second holding part for limiting said radial expansion.

* * * * *

UNITED STATES PATENT AND TRADEMARK OFFICE
CERTIFICATE OF CORRECTION

PATENT NO. : 5,975,506
DATED : November 2, 1999
INVENTOR(S) : Gerhard Thurow and Paul Cerny It is certified that error appears in the above-identified patent and that said Letters Patent is hereby corrected as shown below:

On the title page, in the abstract, line 7: delete "angle a" and substitute -- angle $\alpha$ -- therefor.

In column 6, line 39: delete "paid" and substitute -- said -- therefor.

In column 6, line 67: delete "($d_1$) and" and substitute -- ($d_1$); and, -- therefor.

Signed and Sealed this

First Day of May, 2001

Attest:

NICHOLAS P. GODICI

Attesting Officer      Acting Director of the United States Patent and Trademark Office